(12) United States Patent
Yang et al.

(10) Patent No.: US 8,260,598 B2
(45) Date of Patent: Sep. 4, 2012

(54) SIZE VECTOR SHARING IN CODE GENERATED FOR VARIABLE-SIZED SIGNALS

(75) Inventors: Hongbo Yang, Natick, MA (US);
Xiaocang Lin, Wayland, MA (US);
Haihua Feng, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 519 days.

(21) Appl. No.: 11/652,955

(22) Filed: Jan. 11, 2007

(65) Prior Publication Data

US 2009/0007064 A1   Jan. 1, 2009

(51) Int. Cl.
| G06F 17/50 | (2006.01) |
| G06F 9/44  | (2006.01) |
| G06F 9/45  | (2006.01) |
| G06G 7/62  | (2006.01) |

(52) U.S. Cl. ............................ 703/13; 717/106; 717/146
(58) Field of Classification Search .................... 703/13; 717/106, 146
See application file for complete search history.

(56) References Cited

U.S. PATENT DOCUMENTS

| 5,586,325 | A  * | 12/1996 | MacDonald et al. ......... 717/153 |
| 6,282,699 | B1   | 8/2001  | Zhang et al. |
| 6,437,805 | B1   | 8/2002  | Sojoodi et al. |
| 7,275,026 | B2 * | 9/2007  | Mani et al. ...................... 703/13 |
| 7,313,449 | B1 * | 12/2007 | Ciolfi et al. ..................... 700/21 |
| 7,331,037 | B2 * | 2/2008  | Dickey et al. ................ 717/106 |
| 7,509,244 | B1 * | 3/2009  | Shakeri et al. .................... 703/7 |
| 2006/0064670 | A1 * | 3/2006 | Linebarger et al. .......... 717/106 |
| 2009/0002371 | A1 * | 1/2009 | Linebarger et al. .......... 345/440 |

OTHER PUBLICATIONS

The MathWorks, "SIMULINK Model-Based and System-Based Design", Jun. 2001, Version 4,2-1 to 2-15, 3-1 to 3-10,4-81 to 490, 9-179 to 9-181, and 9-230 to 9-232.*
MathWorks, "Simulink, Simulation and Model-Based Design, Writing S-Functions", Version 6, Sep. 2005.*
Thomas Vogel, "MATLAB Central, MATLAB Newsreader, [Simulink] sfunction with variable sized output" Aug. 26, 2003.*
Bell, Ian et al., "Integration of Hardware into the LabVIEW Environment for Rapid Prototyping and the Development of Control Design Applications," *IKACC Control 2004 Mini Symposia*, pp. 79-81 (2004).
National Instruments, "LabVIEW User Manual," *National Instruments Corporation* (2003).

* cited by examiner

*Primary Examiner* — Kamini S Shah
*Assistant Examiner* — Angel Calle
(74) *Attorney, Agent, or Firm* — Nelson Mullins Riley & Scarborough LLP

(57) ABSTRACT

A method and apparatus to generate code to represent a graphical model formed of multiple graphical modeling components and at least one variable-sized signal is presented. Each variable-sized signal is represented using a size-vector in the generated code. The generated code is optimized by representing multiple variable-sized signals with the same size-vector such that at least two variable-sized signals share a size-vector in the generated code. The size of the variable-sized signal is capable of changing during the execution of the graphical model. The method and apparatus also identifies the owners of the variable-sized signals.

31 Claims, 12 Drawing Sheets

| Block output signal | Variables created | type | Size-vector |
|---|---|---|---|
| A | Switch_out | Dynamic matrix, Maximum size 90x20 | SFunc_size |
| B | Gain_out | Dynamic matrix, Maximum size 90x20 | SFunc_size |
| C | SFunc_out | Dynamic matrix, Maximum size 90x20 | SFunc_size |
| D | MinMax_out | Dynamic matrix, Maximum size 90x20 | SFunc_size |
| E | Concat_out | Dynamic matrix, Maximum size 180x20 | Concat_size |
| F | Abs_out | Dynamic matrix, Maximum size 180x20 | Concat_size |

*Fig. 6*

| Type Descriptor | Primary Type | Base Type |
|---|---|---|
| Type 1 | 1-D Static Matrix Type, Dimensions: 2 | Int |
| Type 2 | 2-D Static Matrix Type, Dimensions: [10, 7] | Double |
| Type 3 | 2-D Static Matrix Type, Dimensions: [90, 20] | Double |
| Type 4 | 2-D Dynamic Matrix Type, Maximum Dimensions: [90, 20] | Double |
| Type 5 | 2-D Dynamic Matrix Type, Maximum Dimensions: [180, 20] | Double |

| Symbol Name | Type | Auxiliary Data | |
|---|---|---|---|
| | | Size-vector | Simulink Signal |
| Switch_out | Type 4 | SFunc_size | A |
| Gain_out | Type 4 | SFunc_size | B |
| SFunc_out | Type 4 | SFunc_size | C |
| MinMax_out | Type 4 | SFunc_size | D |
| Concat_out | Type 5 | Concat_size | E |
| Abs_out | Type 5 | Concat_size | F |
| Const10x7 | Type 2 | N.A. | Const Block Output |
| Const90x20 | Type 3 | N.A. | Const Block Output |
| SFunc_size | Type 1 | N.A. | N.A. |
| Concat_size | Type 1 | N.A. | N.A. |

| Type Descriptor | Primary Type | Base Type |
|---|---|---|
| Type 1 | 1-D Static Matrix Type, Dimensions: 2 | Int |
| Type 2 | 2-D Static Matrix Type, Dimensions: [10, 7] | Double |
| Type 3 | 2-D Static Matrix Type, Dimensions: [90, 20] | Double |
| Type 6 | 2-D Static Matrix Type, Maximum Dimensions: [180, 20] | Double |

802

| Symbol Name | Type | Auxiliary Data | |
|---|---|---|---|
| | | Size-vector | Simulink Signal |
| Switch_out_buf | Type 3 | N.A. | A |
| Gain_out_buf | Type 3 | N.A. | B |
| SFunc_out_buf | Type 3 | N.A. | C |
| MinMax_out_buf | Type 3 | N.A. | D |
| Concat_out_buf | Type 6 | N.A. | E |
| Abs_out | Type 6 | N.A. | F |
| Const10x7 | Type 2 | N.A. | Const Block Output |
| Const90x20 | Type 3 | N.A. | Const Block Output |
| SFunc_size | Type 1 | N.A. | N.A. |
| Concat_size | Type 1 | N.A. | N.A. |

*Fig. 8*

SIZE VECTOR SHARING IN CODE GENERATED FOR VARIABLE-SIZED SIGNALS

BACKGROUND

Graphical modeling environments assist in simplifying the process of designing, simulating, and implementing graphical models for systems. A graphical model is a representation of a system through a graph containing nodes (e.g. blocks) interconnected by arcs (e.g., lines). Nodes are functional entities that perform mathematical operations, transformations and/or other operations on the data and information that is processed by the system. In some graphical modeling environments, the lines represent signals. Signals represent information, such as data, data types, timing information, and control information that connect the output and input of various nodes.

In certain graphical modeling environments, the signals have a number of attributes, such as data dimensions (i.e. signal dimensionality) and data type. Signal data can be organized into a data structure having one or more dimensions (e.g., a vector, a matrix, etc.).

After creating a model in a modeling environment, a user may be able to execute the model by commanding the modeling environment to simulate the system represented by the model. When a model executes, the output of the model may be calculated from a specified start time to a specified stop time.

As a model in a graphical modeling environment executes, signal dimensionality may need to be known so that signals can be properly processed. If signal dimensionality is allowed to vary while the model executes, the time varying information regarding signal dimensions may need to propagate along with the signal values during execution. If the dimensionality of a signal varies while the model executes, the signal is referred to as variable-size signal. It is therefore important to represent variable-sized signals in an efficient way in the generated code for the corresponding model.

SUMMARY

In accordance with one exemplary embodiment, in a computing device, one or more of the variable-sized signals of a graphical model formed are identified. The size of a variable-sized signal is capable of changing during the execution of the graphical model. A code representing the graphical model is generated representing the dimensionality information for each variable-sized signal with a size-vector in the generated code. The generated code is optimized by representing a plurality of variable-sized signals with one size-vector such that at least two variable-sized signals share a size-vector in the generated code.

In accordance with another exemplary embodiment, in a computing device, a graphical model formed of a plurality of graphical modeling components and at least one variable-sized signal is provided. The size of a variable-sized signal is capable of changing during the execution of the graphical model. Each graphical modeling component of the graphical model has at least one input signal and one output signal. The graphical modeling components where the output signal has a same dimension size as the input signal are identified as the owners of their input signals.

BRIEF DESCRIPTION OF FIGURES

Illustrative embodiments will be described below relative to the following drawings.

FIG. 6 illustrates an exemplary hash table used to organize the signal ownership information for the variable-sized signals;

FIG. 7 illustrates an exemplary table of types and table of symbols before dynamic matrix lowering;

FIG. 8 illustrates an exemplary table of types and table of symbols after dynamic matrix lowering.

DETAILED DESCRIPTION

Figure 1:
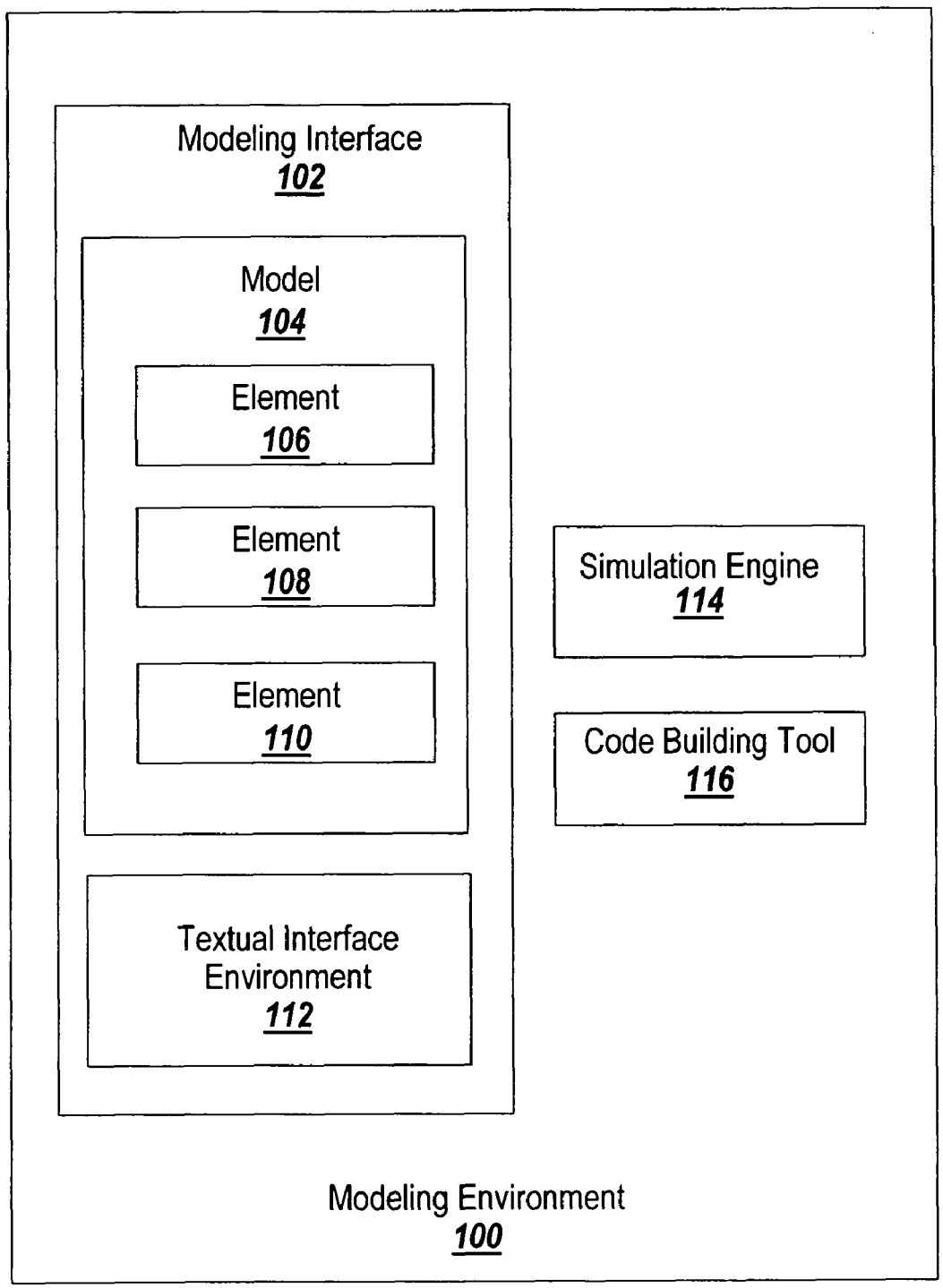
FIG. 1 depicts a high-level block diagram of an exemplary graphical modeling environment that may be used for implementing various embodiments.

Exemplary embodiments described herein automatically generate code to share size-vectors among multiple variable-sized signals. A size-vector holds information regarding the size of a matrix or a vector that represents a variable-sized signal in a graphical model. As a variable-sized signal changes in size, the size-vector updates to hold information regarding the new size. Exemplary embodiments recognize that in some instances certain variable-sized signals in a graphical model have the same sizes. In those instances, variable-sized signals with the same size may change sizes together. As such, these variable-sized signals may share size-vectors. For example, size vectors may be shared in the model and in code generated from the model. Size-vector sharing in the generated code results in less memory allocation and faster code execution.

Signal, as used herein, represents a set of values. For example, a signal may be a set of values that can be stored, read from storage, manipulated, sent from a source to a destination, etc. For example, a signal may be associated with a path (e.g., a connection line) in a graphical modeling environment. The path may indicate a source location for the signal and a destination for the signal. In one implementation, the signal may be read from the source location and stored at the destination. In another implementation, the signal may propagate from the source location to the destination along the path. Signals that can be used with exemplary embodiments can take on different values as a model executes. Signals may have attributes, such as dimensionality, data type, sample rate, etc. A signal type refers to a signal that is a member of a class or classes of signals.

At each time instant, the value of a signal is, in general, an N-dimensional array, where N can take on any positive integer value. For example, a scalar signal is represented by a scalar value at each time instant. Thus, for example, at time $t_0$, a scalar signal may have a value of 3.14. A 1-dimensional signal is represented as a vector at each time instant. For example, at time $t_0$, a 1-dimensional signal may have a value of:

$$\begin{bmatrix} 3 \\ 4.2 \\ 5 \end{bmatrix}$$

A 2-dimensional signal is represented as a matrix at each time instant. For example, at time $t_0$, a 2-dimensional signal may have a value of:

$$\begin{bmatrix} 2 & 4 \\ 2.4 & 4.2 \\ 2.7 & 7.4 \\ 3.1 & 1.3 \end{bmatrix}$$

An "N"-dimensional signal is represented as an N-dimensional array at each time instant.

Dimensions of signals may have sizes associated therewith. For example, the size of the 1-dimensional signal discussed above is 3. The 2-dimensional signal discussed above has a size of 4 for the first dimension and a size of 2 for the second dimension.

Table 1 illustrates some possible dimensions of a signal that can be used with exemplary embodiments described herein. The column (Signal is) shows the representations that can be used to illustrate a signal with dimensions given in the first column. Similarly, the column (Signal is not) shows the representations that may not be used to illustrate a signal with dimensions given in the first column. M and N are positive integers.

FIG. 1 illustrates a high-level block diagram of a modeling environment 100. Modeling environment 100 may be used for modeling, simulating, analyzing, etc., dynamic systems. Modeling environment 100 may include a modeling interface 102, a simulation engine 112, a code building tool 114, and a textual interface 116.

Modeling environment 100 allows a user to develop models in the modeling interface 102. Modeling interface 102 may include an interface that allows a user to interact with one or more models. For example, in one implementation, modeling interface 102 may include a graphical user interface that allows a user to enter information into model 104 and to receive results from model 104. In another implementation, modeling interface 102 may include a textual interface, such as textual interface 112, that allows a user to enter information via, for example, command line prompts. Using the modeling interface 102, a user can create a model 104 that includes, for example, an element 106, an element 108 and an element 110. The elements 106-110 can be, for example, graphical objects or textual objects that can model portions of a system, such as a dynamic system. The user may use predefined elements or user-specified elements to develop a model.

The modeling environment 100 may further include a textual interface 112 that may allow a user to develop a user-defined element using a sequence of commands in a textual language. The textual interface 112 may also facilitate debugging and/or profiling of a model. Alternatively, implementations of the modeling environment 100 may include a separate debugger and profiler.

Simulation engine 114 may include logic to compile and execute the model 104. The simulation engine 114 may communicate with the modeling interface 102. Simulation engine 114 can receive a model such as, for example, a block diagram model, a state diagram model, a UML model, a SysML model, a text-based model (e.g., a sequence of commands),

TABLE 1

| Dimensions | Signal is | Signal is not |
|---|---|---|
| 1-D | 1-D vector, | M-by-N matrix, |
|  | 1-D scalar | 1-by-N matrix (row vector), |
|  |  | M-by-1 matrix (column vector), |
|  |  | 1-by-1 matrix (2-D scalar) |
| 2-D | M-by-N matrix, | 1-D vector, |
|  | 1-by-N matrix (row vector), | 1-D scalar |
|  | M-by-1 matrix (column vector), |  |
|  | 1-by-1 matrix (2-D scalar) |  |
| Scalar | 1-D scalar, | 1-D vector with length > 1, |
| (1-D or 2-D) | 1-by-1 matrix (2-D scalar) | M-by-N matrix with M > 1 and/or N > 1 |
| Vector | 1-D vector, | M-by-N matrix with M > 1 and N > 1 |
| (1-D or 2-D) | 1-D scalar, |  |
|  | 1-by-N matrix (row vector), |  |
|  | M-by-1 matrix (column vector), |  |
|  | 1-by-1 matrix (2-D scalar) |  |
|  | Vector (1-D or 2-D) or scalar |  |
| Row Vector | 1-by-N matrix (row vector), | 1-D vector, |
| (2-D) | 1-by-1 matrix (2-D scalar) | 1-D scalar, |
|  | Row vector (2-D) or scalar | M-by-N matrix with M > 1 |
| Column | M-by-1 matrix (column vector), 1-by-1 | 1-D vector, |
| Vector | matrix (2-D scalar) | 1-D scalar, |
| (2-D) | Column vector (2-D) or scalar | M-by-N matrix with N > 1 |
| Full matrix | M-by-N matrix with M > 1 and N > 1 | 1-D vector, |
|  |  | 1-D scalar, |
|  |  | 1-by-N matrix (row vector), |
|  |  | M-by-1 matrix (column vector), |
|  |  | 1-by-1 matrix (2-D scalar) |
| Square matrix | M-by-N matrix with M = N, | M-by-N matrix with $M \neq N$, |
|  | 1-D scalar, | 1-D vector, |
|  | 1-by-1 matrix (2-D scalar) | 1-by-N matrix (row vector), |
|  |  | M-by-1 matrix (column vector) | etc., that is generated using the modeling interface 102. Simulation engine 114 can convert the model to an executable form, referred to as a compiled model. Simulation engine 114 can repetitively execute the compiled model e.g., via successive time steps from a simulation start time to a stop time specified by the user or until the simulation is interrupted. Alternatively, the simulation engine 114 may enable interpretive simulation of the model.

Code building tool 116 may include logic to generate code from a model. For example, code building tool 116 can be used to generate code, such as source code, object code, a compiled executable or library for forming an executable of a model provided by the modeling interface 102, etc. Code building tool 116 can also be used to generate a hardware description language representation of the model. Code building 116 tool uses implementations of code for portions of a model to generate executable code, instructions, etc., in a programming language such as Java, Javascript, C or C++ or a hardware description language such as Verilog or Very-high-speed-integrated-circuit Hardware Description Language (VHDL). To generate code, code building tool 116 can convert a source model language representation of a model to a target language. Code building tool 116 may include an extended version of a code building tool such as the Real-Time Workshop® tool from The MathWorks, Inc. of Natick, Mass, or any portion thereof, or may be substantially any software component/application for generating executable code, instructions, etc., in a programming language such as Java, C, etc., or in a hardware description language such as Verilog, VHDL, etc.

Code building tool 116 can generate source code for the execution of a model that is provided by the modeling interface 102, and can compile the source code into object code and build an executable program, library or substantially any other form of executable instructions. The generated code may be designed to run on any processor, microprocessor, dual-core processor, multi-core processor, cluster of processors, operating system, computational hardware device, component of a computational hardware device, etc. In one embodiment, the code may include embedded code targeted to run on an embedded system. Additionally, the code can be customized to run on a specific target hardware platform. For example, the generated code may include fixed-point code to run a fixed-point processor or code can be generated to emulate fixed-point behavior on a floating-point processor.

One of ordinary skill in the art will also appreciate that the components of the modeling environment 100 may be provided on a computing device, as described below with reference to FIG. 2A, or alternatively, the components of the modeling environment 100 may be coupled to each other via a communication network, as described below with reference to FIG. 2B.

Figure 2A:
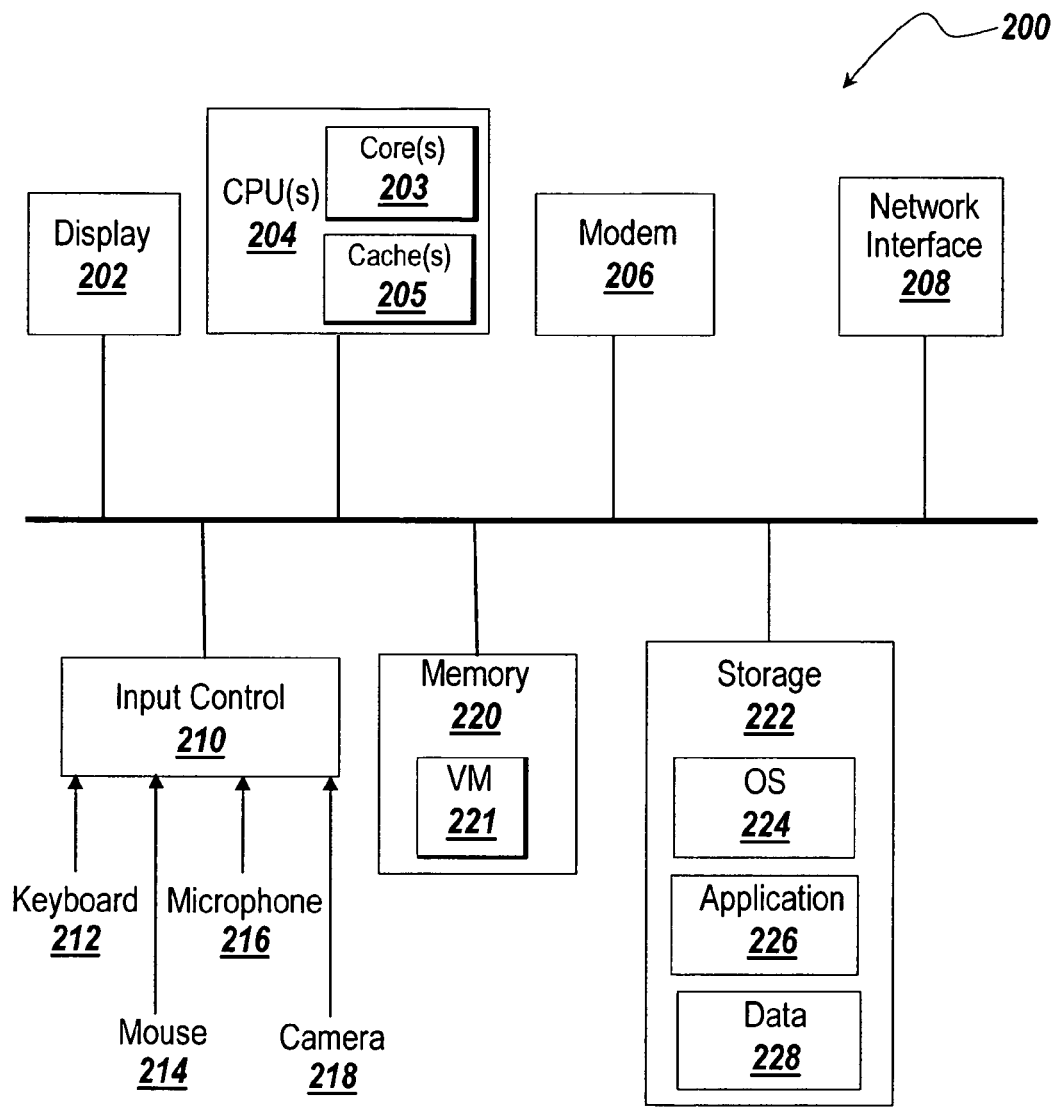
FIG. 2A depicts an exemplary computing device suitable for practicing the exemplary embodiments.

FIG. 2A is an exemplary computing device 200 suitable for practicing the illustrative embodiment of the present invention. One of ordinary skill in the art will appreciate that the computing device 200 is intended to be illustrative and not limiting of the present invention. The computing device 200 may take many forms, including but not limited to a personal computer, workstation, server, network computer, optical computer, Internet appliance, mobile device, a pager, and a tablet computer.

The computing device 200 may be electronic and may include a display 202, a Central Processing Unit (CPU) 204, a modem 206, a network interface 208, an input control 210, memory 220, storage 222, etc. The CPU 204 may control each component of the computing device 200 to provide the modeling environment 100, textual interface environment 112, simulation engine 114, and/or code building tool 116. The memory 220 may temporarily store instructions and data and may provide them to the CPU 204 so that the CPU 204 operates the computing device 200 and may run the modeling environment 100, textual interface environment 112, simulation engine 114, and/or code building tool 116, based on the stored instructions.

Optionally, the computing device 200 may include multiple CPUs 204 for executing software loaded in the memory 220, and other programs for controlling system hardware. Each of the CPUs can be a single or a multiple core processor 203 and may have one or more caches 205. The code loaded in the memory 220 may run in a virtualized environment, such as in a Virtual Machine (VM) 221. Multiple VMs 221 may be resident on a single processor. Also, part of the application could be run in hardware, for example, by configuring a field programmable gate array (FPGA), using an application specific instruction set processor (ASIP) or creating an application specific integrated circuit (ASIC). Further, the part of the applications may be run on analog electronic devices or other resources may be used to run part of the application, such as graphics processing units (GPUs) or dedicated hardware such as Fast Fourier Transform (FFT) processing blocks.

Storage 222 may contain software tools for applications. Storage 222 can include code 224 for the operating system (OS) of device 200, code 226 for applications running on the operation system including the applications for the modeling interface 102, textual interface environment 112, simulation engine 114, code building tool 116 and data 228 generated from the modeling interface 102, textual interface environment 112, simulation engine 114, and code building tool 116. Those of ordinary skill in the art will appreciate that parts of the applications can be stored in the CPU cache or memory 220 as well, much like the data, and even the OS, or they can be stored on the network described below with reference to FIG. 2B.

The input control 210 may interface with a keyboard 212, a mouse 214, a microphone 216, a camera 218, such as a web camera, or other input devices such as, for example, a motion based input device. The computing device 200 may receive, through the input control 210, input data, such as the input data for developing a model. The computing device 200 may display on the display 202 user interfaces for displaying the data generated from the modeling interface 102, textual interface environment 112, simulation engine 114, and code building tool 116.

Figure 2B:
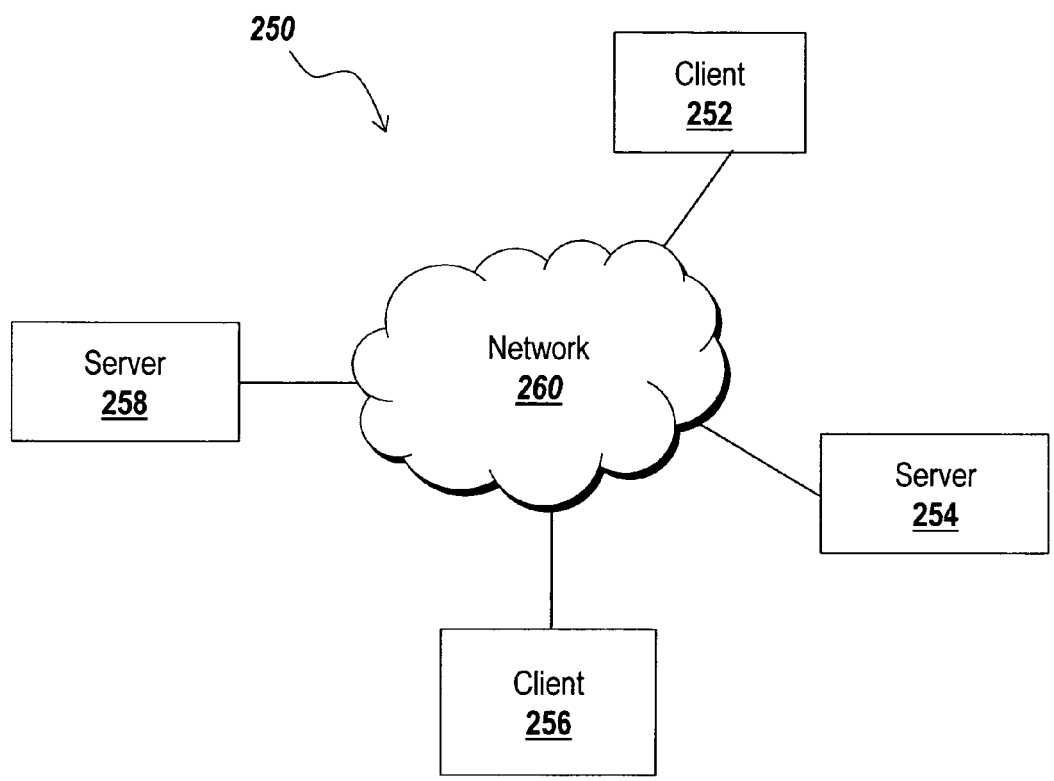
FIG. 2B depicts an exemplary distributed system suitable for practicing a distributed implementation of exemplary embodiments.

FIG. 2B is an exemplary network environment 250 suitable for the distributed implementation of an illustrative embodiment. The network environment 250 may include one or more servers 254 and 258 coupled to clients 252 and 256 via a communication network 260. The network interface 208 and the modem 206 of the computing device 200 enable the servers 254 and 258 to communicate with the clients 252 and 256 through the communication network 260. The communication network 260 may include Internet, intranet, Local Area Network (LAN), Wide Area Network (WAN), Metropolitan Area Network (MAN), wireless network (e.g., using IEEE 802.11 and Bluetooth), etc. In addition the network may use middleware, such as Common Object Request Broker Architecture (CORBA) or Distributed Component Object Model (DCOM) to allow a computer on the network to communicate directly with another computer or device that is connected to the network. The communication facilities can support the distributed implementations of the present invention. In addition, the communication network 260 may use Remote Method Invocation (RMI) or Remote Procedure Call (RPC) technology. RMI and RPI are exemplary technologies that allow functions, methods, procedures, etc., to be called over the environment 250. For example, the client 252 may invoke a method that resides remotely on the client 256.

In the network environment 250, the servers 254 and 258 may provide the clients 252 and 256 with software components or products under a particular condition, such as a license agreement. The software components or products may include those for providing the modeling environment 100 and/or implementations of code for select elements. The software components or products may also include those for the textual interface environment 112, simulation engine 114, and code building tool 116 coupled to the modeling environment 100.

In one example, the client 252 may perform the modeling of a dynamic system using a software component provided by the server 254 and send the server 254 the model for simulation. The server 254 may return the simulation results to the client 252 and the client 252 may subsequently display the data to the user with the information on the data.

In another example, the client 252 may have the modeling environment 100 and may desire additional implementations of code for select models. The client 252 may have implementations of code that are already loaded on the client 252 or may have to download each implementation of code the client 252 desires. In either case, the server 252 may store implementations of code that the user can download. The user may be charged a fee to download the implementation of code. The implementation of code may be specialized code that provides an advantage over an implementation of code to which client 252 currently has access.

In another example, the client 252 can access the server 254 and/or 258 to access a repository of implementations of code. The implementations of code in the repository can be maintained and updated by an administrator. The repository can serve as a central location to access implementations of code for the clients 256 and 252. The clients may also be able to upload implementations of code to the repository. Alternatively, the clients 256 and 252 can access the repository of implementations of code via a network such as the Internet to download or upload implementations of code. The implementations of code may be put under version control in the repository and may have information as well as index terms associated with them. The information can be text or any other format for information storage such as the eXtended Markup Language (XML).

Exemplary embodiments are described for illustrative purposes relative to a Simulink®-compatible modeling environment that enables a graphical model to be built and/or executed. A SIMULINK-compatible modeling environment provides means (e.g., via hardware or software based logic) to use a SIMULINK model and/or features in the SIMULINK-compatible modeling environment. For example, a SIMULINK-compatible modeling environment may provide means to interface with a SIMULINK model, means for importing or exporting a SIMULINK model, means for translating a SIMULINK model, means for integrating a SIMULINK model, etc. Although exemplary embodiments may be described relative to a SIMULINK-compatible modeling environment, the present invention is not limited to these embodiments and may be applied to graphical modeling and/or computing tasks via other graphical modeling environments.

Further examples of graphical modeling environments that may be used to develop and/or execute a graphical model in accordance with exemplary embodiments include, but are not limited to, LabVIEW® or MATRIXx from National Instruments, Inc., SoftWIRE by Measurement Computing, VisSim by Visual Solutions, WiT by DALSA Coreco, VEE Pro by Agilent, Dymola from Dynasim AB, Extend from Imagine That, Inc., Scicos from The French National Institution for Research in Computer Science and Control (INRIA), MSC.Adams® from MSC.Software Corporation, Rhapsody® from iLogix, Inc., Rational® from International Business Machines Corporation, ARTiSAN Studio from ARTiSAN Software Tools, Inc., SCADE™ from Esterel Technologies, Inc., among others.

Figure 3A:
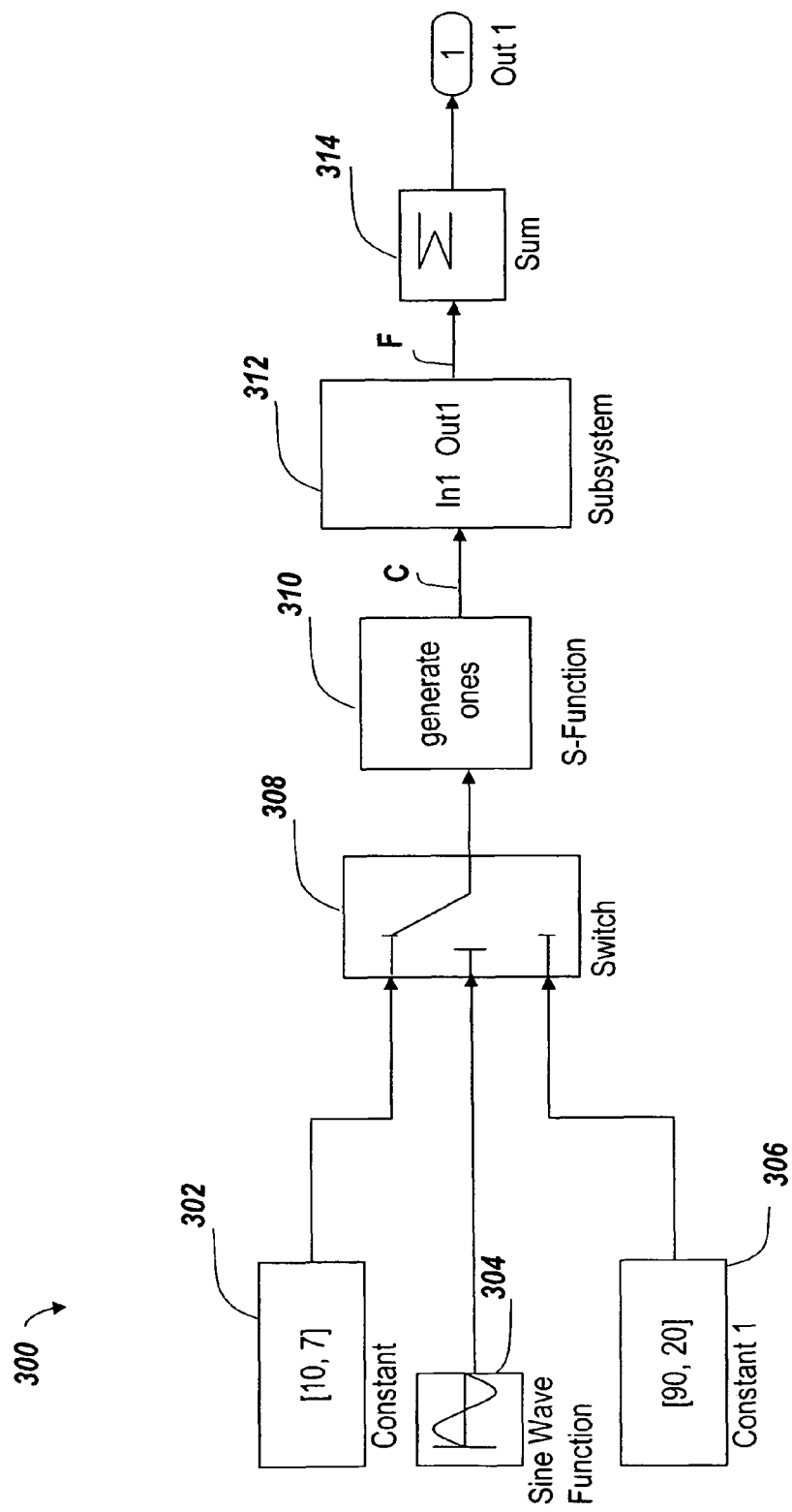
FIG. 3A illustrates components of an exemplary graphical model.

FIG. 3A illustrates exemplary components of an illustrative graphical model 300 in a graphical modeling environment. The graphical model 300 includes a number of blocks 302, 304, 306, 308, 310, 312 and 314. Model 300 further includes signals C and F that can interconnect blocks in model 300, such as blocks 310, 312 and 314. Those skilled in the art will recognize that the term "blocks" does not refer exclusively to elemental dynamic systems but may also include other modeling elements (e.g., graphical elements, icons, symbols, etc.) that aid in readability and modularity of graphical models.

Model 300 has three source blocks: constant block 302 that outputs a matrix of dimension 1×2, equal to [10, 7], sine-wave function 304 that outputs a sinusoidal function and constant1 block 306 that outputs a matrix of dimension 1×2, equal to [90, 20]. The input of the model 300 is set by the switch block 308. The switch block 308 passes through the first (top) input 302 or the third (bottom) input 306 based on the value of the second (middle) input 304. The first 302 and third 306 inputs are called data inputs. The second input 304 is called the control input. As such, the output of the switch 308 is either equal to the output of the constant block 302 or the constant1 block 306. Both of these signals are static matrices of size 1×2. Therefore, the output of switch 308 is not a variable-sized signal, it is a static signal.

The output of the switch 308 is then fed into the S-Function block 310. The S-function block 310 is set to generate a matrix of ones. The S-Function block 310 can be set to manipulate the size attribute of its inputs. For the model 300 illustrated in FIG. 3A, the S-Function 310 is set to change the size attribute of its static signal input to a dynamic signal output C.

The output signal of the S-function block 310 becomes the input for the subsystem block 312. The subsystem block 312 has a variable-sized signal input C and a variable-sized signal output F. The dynamics of subsystem 312 is illustrated in more detail in FIG. 3B.

Figure 3B:
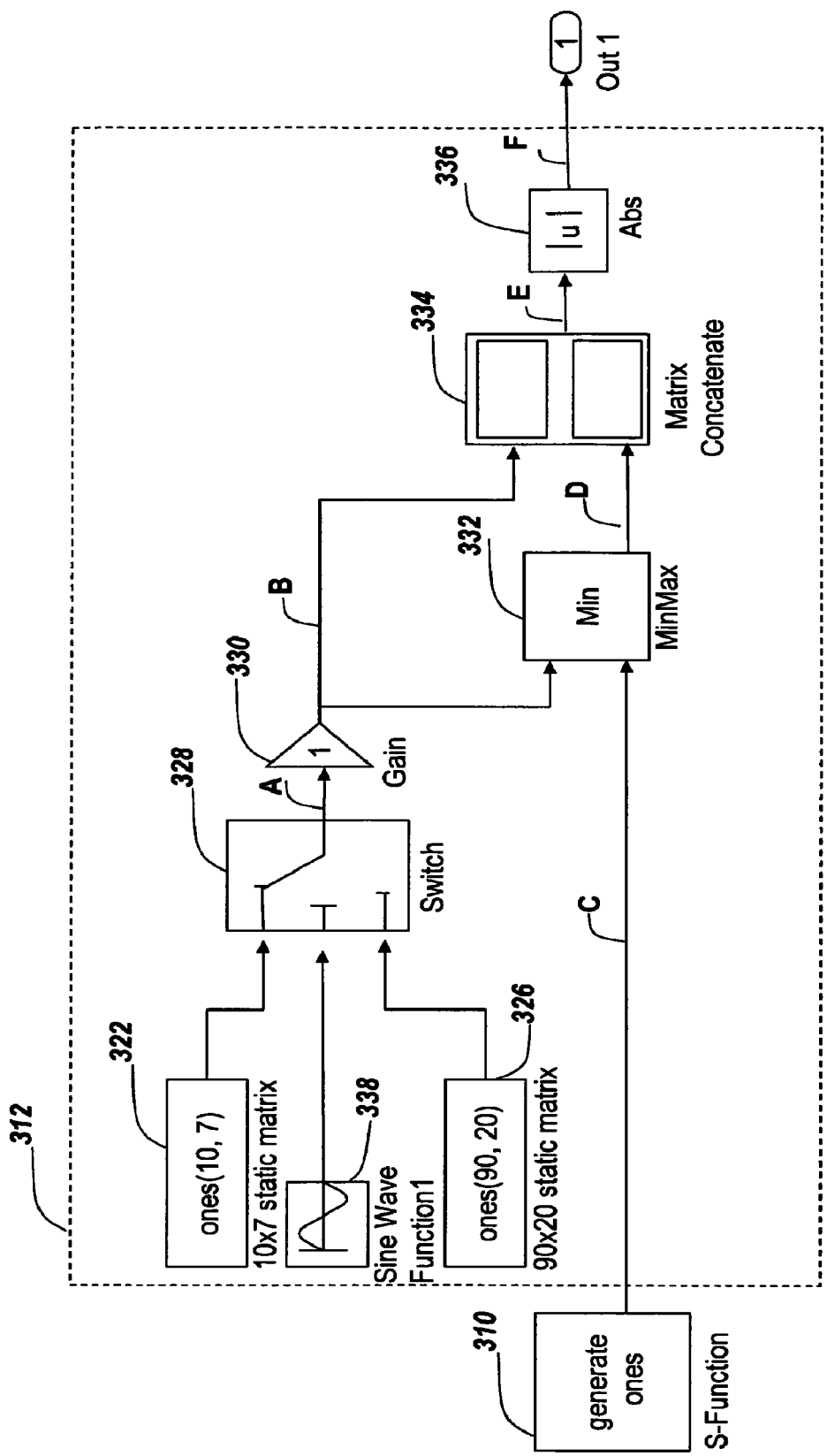
FIG. 3B illustrates in more detail graphical modeling components of the exemplary graphical model illustrated in FIG. 3A.

FIG. 3B illustrates in more detail the components of the subsystem block 312. The subsystem 312 has three source blocks. The source blocks in this example are a 10×7 static matrix block 312 outputting a matrix formed of ones, of dimension 10×7, a sine-wave function1 338 outputting a sinusoidal function and a 90×20 static matrix block 326 outputting a matrix formed of ones, of dimension 90×20. The input of the subsystem 312 is set by the switch block 328. The switch block 328 passes through the first (top) input 322 or the third (bottom) input 326 based on the value of the second (middle) input 338. As such, the output of the switch 328 is either equal to the output of the 10×7 static matrix 322 or the 90×20 static matrix block 326. Therefore, the output of switch 328 is a variable-sized signal, of size 10×7 or 90×20.

The variable-sized signal A is the output of the switch block 328 and the input of the gain block 330. The gain block 330 has a scalar value of 1. The gain block multiplies its input signal A by the gain value. Therefore, the size of the output signal B of the gain block is variable as well. The output signal B is, at the same time, one of the two inputs of the MinMax block 332.

As explained above, the S-Function block 310 is set to generate a matrix of ones. The output of the S-Function block 310 is the variable-sized signal C. The variable-sized signal C is the other input of the MinMax block 332. The MinMax block 332 is set to choose the minimum of its inputs, signal C and signal B. The MinMax block 332 cannot change the size of the input signals B and C either. In order to be compared by the MinMax block 332, the signals C and B must have the same size. The size of the output signal D of the MinMax block 332 will be equal to the size of either of the inputs of the MinMax block 332.

The signals B and D are the two input signals of the matrix concatenate block 334. The matrix concatenate block 334 will concatenate the input signals B and D. The size of the output signal E of the Matrix Concatenate block will be larger than the size of the input signals B and D of the Matrix Concatenate block 334.

The last element of the subsystem block 312 is the abs block 336. The abs block 336 takes the absolute value of the input signal E. The size of the output signal F of the abs block 336 will be the same as the size of its input signal E since the abs block 336 is not designed to change the size of its input.

In a SIMULINK-compatible environment, each block must have the information about whether the block is the owner of the input and output signals when the signal sizes are compatible. Similarly, each signal must have the information about which block is the owner of that signal. At code generation time for each block that owns its output, a size-vector is generated.

Once the variable-sized signals A, B, C, D, E and F are identified in FIG. 3B, they can be grouped together according to their owners. Each block of the graphical model 300 may own one or more variable-sized signals. Each variable-sized signal is owned by one and only one block. Only the owner of the variable-sized signal can change the dimension of the signal. All other blocks are exempt from the task. When an owner changes the dimension of its output signal, the dimensions of all the signals that it owns may have their dimension changed. The variable-sized signals are represented using size-vectors in the generated code. Representing a group of variable-sized signals with one size-vector results in creating a minimum number of size-vectors. Having a reduced number of size-vectors results in faster simulation. The simulation also consumes less memory. Furthermore, size-vector sharing results in faster code execution since the memory requirement of the generated code is reduced.

The size-vector sharing feature can be implemented to leverage size propagation. The blocks of a SIMULINK-compatible environment can be configured to automatically inherit their data attributes, such as type and size, via forward or backward propagation. Inheriting data attributes minimizes data entry and makes it easier to change the data types of signals as the model evolves. For illustrative purposes, it is worthwhile considering how a SIMULINK-compatible environment does size propagation.

As described above regarding FIG. 1, a model is first created in a modeling environment 100. Simulation engine 114 creates the simulation of the model. The code building tool 116 generates the corresponding code. For the exemplary embodiments described herein, SIMULINK-compatible environment may be used to generate models and run simulations. The Real Time Workshop® tool from The MathWorks, Inc. of Natick, Mass. may be used to generate the code.

In one exemplary embodiment, an environment may perform size propagation in two passes. For example, a forward propagation pass and a back propagation pass may be used. Based on the result of the two passes of size propagation, the ownership of variable-sized signals is determined. The ownership information is what leads to an efficient code that shares size-vectors. An alternative embodiment may perform size propagation using a single pass, either forward or back propagation. Other alternative embodiments may derive the ownership of variable-sized signals without using propagation techniques.

Size propagation is used to derive allowable size-vector sharing. The size propagation comprises two steps: forward propagation and backward propagation. Forward propagation starts from root-level Inport blocks and follows the direction of signals from the block that writes to a signal to a block that reads from the signal. Forward propagation ends at root-level Outport blocks. Backward propagation is performed to resolve dimension of signals left unresolved by forward propagation. For each block in the block diagram, based on the operating mode of the block, the output signal of a block has either the same dimension as the input (in which case size-vector sharing is possible) or a different dimension (in which case the block owns its output signal). After size-propagation each signal has one and only one owner block. A one-dimensional array may be used to store the ownership information. In case where a variable-sized signal may be owned by two separate blocks, one block is arbitrarily chosen as the owner.

Size propagation may be used to determine the dimension for all signals. Typically, a user will specify the dimension of the input signal of the graphical model. The size propagation then assigns a dimension to all signals of the graphical model. It should be appreciated that other size propagation approaches and approaches that are not propagation based may be used. The above example is intended to be merely illustrative and not limiting.

Figure 4:
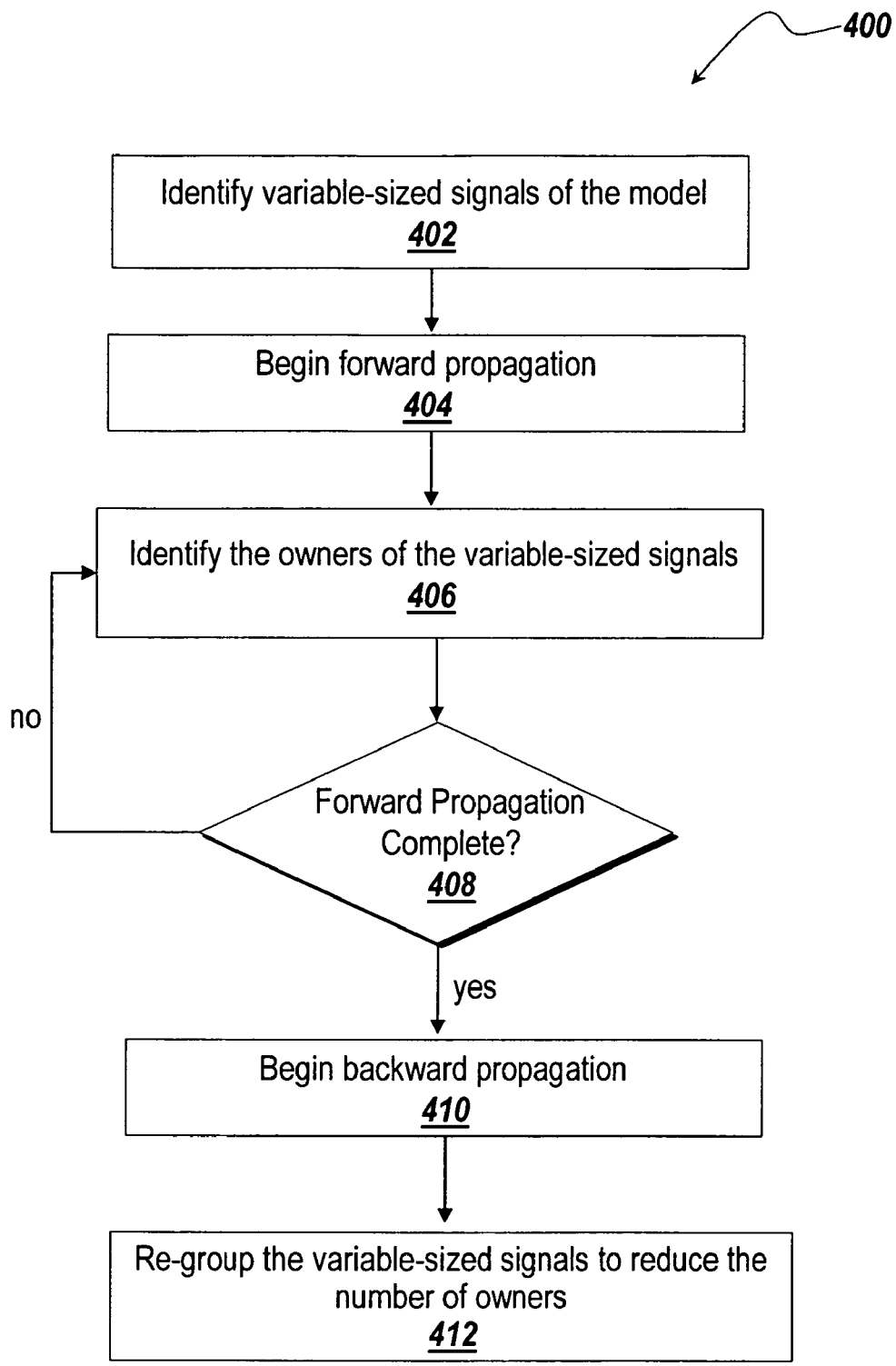
FIG. 4 is a flow diagram illustrating exemplary processing that can be used to identify owners of the variable-sized signals.

The flow diagram 400 of FIG. 4 depicts exemplary processing that can be used for identifying the owners of the variable-sized signals. The processing may begin with identifying the variable-sized signals of the models (step 402). Then using forward propagation (step 404), the owners of the variable-sized signals are identified (step 406). Once the forward propagation is completed (step 408), using backward propagation (step 410), the variable-sized signals are regrouped based on the size of the variable-sized signals (step 412). This leads to a reduced number of owners to be represented in the corresponding code.

Figure 5A:
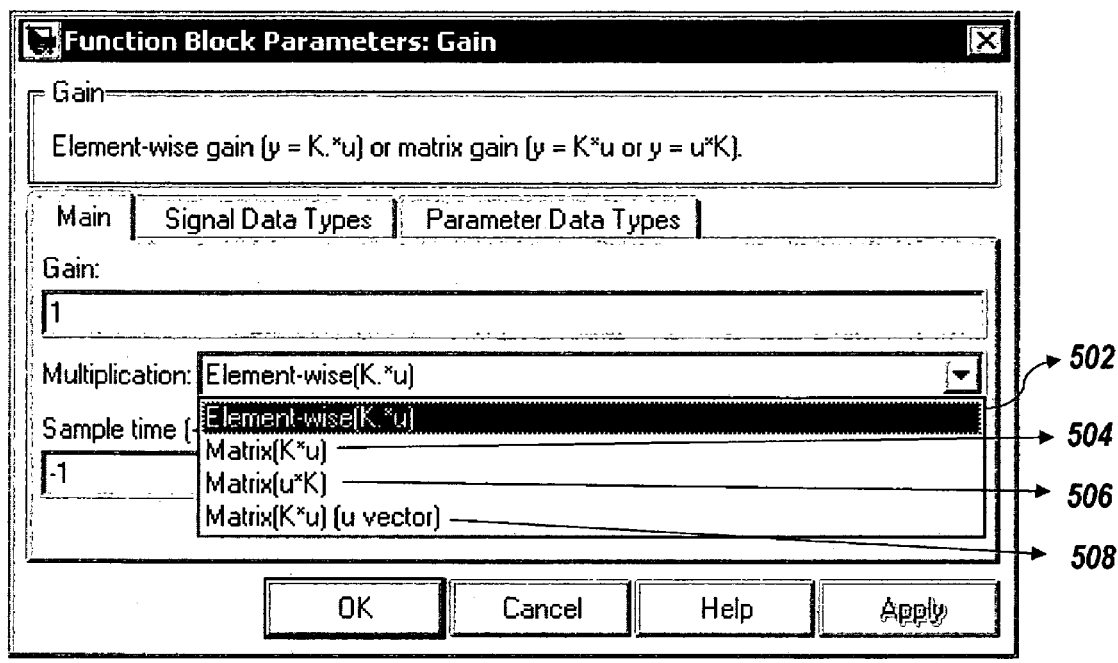
FIG. 5A illustrates an exemplary view of the operation modes of a block in a graphical model.

In one exemplary embodiment, each block of the graphical model may have a pre-defined property about whether its output inherits the dimension size from its input. As illustrated in FIG. 5A, a gain block may have four operating modes:

1. Element-wise gain 502
2. Left-multiply gain 504
3. Right-multiply gain 506
4. Right-multiply gain, where the input is treated as a column matrix 508.

Figure 5B:
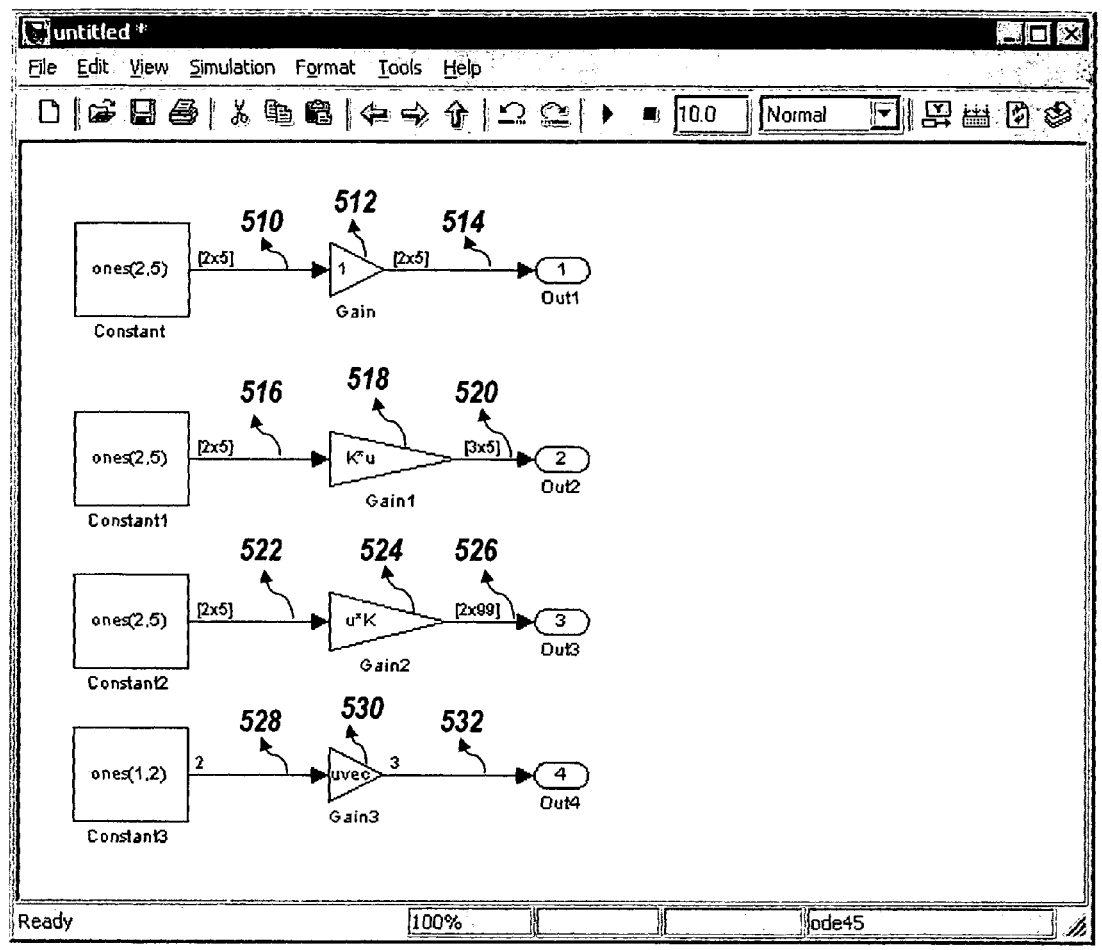
FIG. 5B illustrates the size information of the inputs and outputs for each operation mode of FIG. 5A.

Only in the first operating mode, element-wise gain 502 produces an output with the same size as the input. The dimensions of the input and the output for each case are illustrated in FIG. 5B. The first example of FIG. 5B illustrates the case where the operating mode of the gain block is element-wise gain 502. The input 510 is a matrix of size 2×5. The gain of the gain block 512 has a scalar value of 1. The gain block 512 performs a multiplication operation of the input 510 with the scalar value of 1. Therefore, the size of the output 514 is equal to the size of the input 510. Similarly, the second example of FIG. 5B illustrates the case where the operating mode of the gain block is left-multiply gain 504. The input

516 is a matrix of size 2×5. The gain of the gain block 518 is a matrix K of size 3×2. The gain block 518 performs a left matrix multiplication operation of the input 516 with matrix K of size 3×2. Therefore, the size of the output 520 is equal to the size of the matrix multiplication. In this case the size of the output is 3×5.

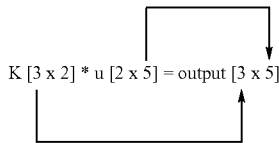

K [3 x 2] * u [2 x 5] = output [3 x 5]

The third example of FIG. 5B illustrates the case where the operating mode of the gain block is right-multiply gain 506. The input 522 is a matrix of size 2×5. The gain of the gain block 524 is a matrix K of size 5×99. The gain block 524 performs a right matrix multiplication operation of the input 522 with matrix K of size 5×99. Therefore, the size of the output 526 is equal to the size of the matrix multiplication. In this case the size of the output is 2×99.

$u[2\times5]*K[5\times99]=\text{output}[2\times99]$

The fourth example of FIG. 5B illustrates the case where the operating mode of the gain block is right-multiply gain, where the input is treated as a column matrix 508. The input 528 is a matrix of size 2×5. The gain block 530 allows the input to be 1×n, n×1 or vector of length n, for all these cases, the input is treated as vector of length n. In the illustrated example, n is equal to 2 and K is a matrix of size 3×2. The gain block 530 performs a right matrix multiplication operation of the input 528 treated as a column matrix of size 2 with matrix K of size 3×2. Therefore, the size of the output 532 is equal to the size of the matrix multiplication. In this case the size of the output is 3.

Furthermore, for a user-written S-Function block, a graphical modeling environment may give a user an Application Programming Interface (API) to specify whether the output of the block inherits the dimension size from the input of the block. For example, in a SIMULINK-compatible environment, the inheritance can change because blocks can adapt their functionality based on characteristics of inputs and outputs of the blocks.

FIG. 3B illustrates in more detail graphical modeling components of the exemplary graphical model illustrated in FIG. 3A and may be used to determine how the ownership information can be derived. In FIG. 3B, the gain parameter of the gain block 330 is a scalar and the input signal A of the gain block 330 is represented by a matrix. The gain block 330 may scale the input signal A by the value of the gain block's 330 parameter. The gain block 330 may then generate an output signal B represented by a new matrix as a result of the multiplication of the gain parameter of the gain block 330 and the input signal A. The matrix representing the output signal B may have the same dimension as the matrix representing the input signal A. However, the gain parameter of the gain block 330 may be a matrix as well. In that case, the gain block 330 computes a matrix multiplication. The result of the matrix multiplication generates an output signal represented by a matrix whose dimension is different than the dimension of the matrix representing the input signal.

If a block owns its output signal, the block may also own other signals that have a same dimension-size as the block's output signal. For example, for the graphical model shown in FIG. 3B, the following ownership information can be derived based on forward propagation:

1. S-Function 310 owns signal C;
2. Switch 328 owns signals A, B and D, (signals A, B and D have the same size);
3. Concatenation block 334 owns signal E and F, (signals E and F have the same size).

The derivation of the size of the signals in the direction of the information flow is called forward propagation. Based on this partial result, at least three size-vectors need to be generated in the code for the graphical model illustrated in FIG. 3B.

Backward propagation may follow forward propagation in an exemplary embodiment. The two inputs of the MinMax block 332 are both matrices. These two inputs can have the same dimension. Therefore, in this example, the ownership of the signals A, B and D can be safely transferred to the S-Function block 310. Thus, the number of owners can be reduced from three to two. The reduction on owners can translate to improved code generation with less dimension assignment and less memory usage to store the dimensions. If S-Function block 310 changes the size of signal C, signals A, B, C and D can have their sizes changed. If concatenation block 34 changes the size of the signal E, signal F can have its size changed. The gain block 330, MinMax block 332 and abs block 336 are not owners, and thus, they cannot change the size of any signals.

For the model illustrated in FIG. 3B, the generated code may define two size-vectors, SFunction_size and concat_size. Operations performed by the S-Function 310, Switch 328, Gain 330 and MinMax 332 blocks may use the size-vector SFunction_size when the dynamic dimension is needed. Abs block 336 and Concatenate 334 blocks may use concat_size when the dynamic dimension is needed. Creating a minimum number of size-vectors in the generated code may require less effort, eliminate the need to do inter-procedural analysis and may avoid costly compiler analysis, such as alias analysis and expression folding.

The size-vector sharing mechanism described herein also applies for model reference (i.e. size-vectors may be shared among models that reference via model reference mechanisms).

Model reference allows the main model include other models as modular components. The technique provides useful features because it simplifies working with large models by letting the designer build large models from smaller ones. The technique also lets the designer generate code simultaneously for all the modules in the entire model and only regenerate code for modules that change. The technique further allows the designer to develop the modules independently and lets the designer reuse modules and models by reference, rather than including the model or module multiple times in the main model. Also, multiple models can refer to the same model or module. Model referencing can be applied to models as well as subsystems.

In case of a referenced model, the referenced source is a standalone model that can be stored by itself, operated on in isolation. It is a model in every sense, so it has a selected solver, sample time, interface, error and warning diagnostic settings, optimization settings, etc. Model referencing technology resolves any discrepancies or conflicts between model settings of the referencing and referenced model. A referenced model may convey its interface information to the referencing model and the referenced model may be stored at the call site. A model may be restricted to only one reference, no references at all, or a plurality of references.

In case of a referenced subsystem, the referenced source is stored in a container, called a library. A library subsystem can have the same referencing restrictions. The library subsystem may automatically update the referenced source when changes are made at a call site. The library subsystem can copy over the content of a referenced subsystem to the call site to it can be edited without affecting the source. It may lock the call site to it is read only.

The Subsystem 312 may be created as a standalone model and may be referenced in the main model. In that case, the above-mentioned size-vector sharing may also be performed among models.

A graphical modeling environment may have the capability to generate code for a subsystem as a function. By generating code for a subsystem as a function, the above propagation result may lead to cross-function size-vector reuse. For the model illustrated in FIG. 3B, a function may be generated for the model (named main) and another function may be generated for the subsystem (named foo). SFunction_size and concat_size may be defined in the function main and both may be passed in to the function foo. Therefore, the function foo can use the size-vector SFunction_size to carry out the computation of Switch 328, MinMax 332 and Gain 330. Similarly, the function can use the size-vector concat_size to carry out the computation of the Sum block 314.

At the code generation time, a SIMULINK-compatible environment may create an internal representation (IR) to represent the operations being performed by the block diagram. FIG. 6 illustrates an exemplary hash table 600 of IR that is used to organize the ownership information for each variable-sized signal. IR conveys the block functionality information using matrix notations. Conventionally, matrices are static. A SIMULINK-compatible environment may use a dynamic matrix to represent the variable-sized signals in IR. A single code construction implementation may be used for a block that accepts both fixed-sized and variable-sized input signals.

FIG. 7 illustrates the IR created for the subsystem shown in FIG. 3B. IR of FIG. 7 has a table of types 700 and a table of symbols 702. A number of optimization and transformation steps are applied to IR. Two relevant transformations are scalarization and dynamic matrix lowering.

As shown in FIG. 7, the initial IR uses matrix operation which is not defined in C and HDL languages. Thus, IR must be translated to a scalar operation using scalarization. Scalarization uses information provided in the hash table 600 to scalarize matrix operations involving dynamic matrices. Scalarization generates corresponding loops, using either integer constant as loop upper bound (if matrix dimension is known at compile time, i.e. static matrix), or variable as loop upper bound (if matrix dimension is not known at compile time, i.e. dynamic matrix). For example, for the statement Gain_out=1*Switch_out, scalarization will generate the following loop:

```
MATRIX_DIM(Gain_out, 0) = MATRIX_DIM(Switch_out, 0);
MATRIX_DIM(Gain_out, 1) = MATRIX_DIM(Switch_out, 1);
   for (i = 0; i < MATRIX_DIM(Switch_out, 0); i++) {
   for (j = 0; j < MATRIX_DIM(Switch_out, 1); j++) {
      Gain_out[i, j] = 1 * Switch_out[i, j];
      }
   }
```

The scalarization first derives the dimension of the generated loop. By looking up the hash table 600 it determines that Switch_out is a 2-D dynamic matrix whose first and second dimension is given by SFunc_size[0] and SFunc_size[1], and it also determines that Gain_out is a dynamic matrix of the same type and the same size, thus it generates a loop for this assignment. Scalarized IR doesn't have any matrix operation and is close to final generated C code (or VHDL code in case of using, for example, HDL coder). Scalarized IR uses only two size-vectors, SFunc_size and Concat_size, rather than using a different size-vector for each variable-sized signal.

Scalarization transforms the matrix operations to operations on each matrix element and generates corresponding loops. The symbols with dynamic matrix types are kept after scalarization. C and HDL languages do not have dynamic matrix type. Therefore, the IR generated after scalarization still cannot be directly translated to the target language.

Another transformation step called dynamic matrix lowering may be used after scalarization. Dynamic matrix lowering decomposes a symbol with dynamic matrix type to one symbol representing the size and another symbol representing the data buffer. All IR operations accessing the dynamic matrix dimension will be then translated to access to the size vector. All IR operations accessing element of dynamic matrix will be translated to access the element of corresponding data buffer. New symbols may be created during dynamic matrix lowering. These new symbols will be added to the type table 700 and symbol table 702. Old symbols with dynamic matrix type will not be used in the control flow graph. Thus, the old symbols can be eliminated. FIG. 8 illustrates the table of types 800 and table of symbols 802 for the new symbols.

There are no size-vector assignments to the dimension of output of Gain 330 in the generated code. This is a result of size-vector sharing. Gain 330 does not own the dimension of its output signal B. Gain 330 is thus exempt from the task of maintaining the dimension size of its output. Similarly, in the final code, there will be no assignment to the dimension of output of Switch 328, MinMax 332 and Abs 336.

All symbols and language constructs used by IR can be translated to C or HDL language. IR may go through other optional transformations before the final code is generated. Providing the dynamic matrix type in IR makes the code construction easier since block code construction algorithm can construct dynamic matrix operations rather than creating For-loop. The code generation framework obtains the size-vector sharing information for blocks and encodes the information in a symbol table. Scalarization and dynamic matrix lowering leverage the size-vector sharing information provided by the size-propagation and jointly achieve size-vector sharing. As a result, the generated code uses less memory and runs faster.

Figure 9:
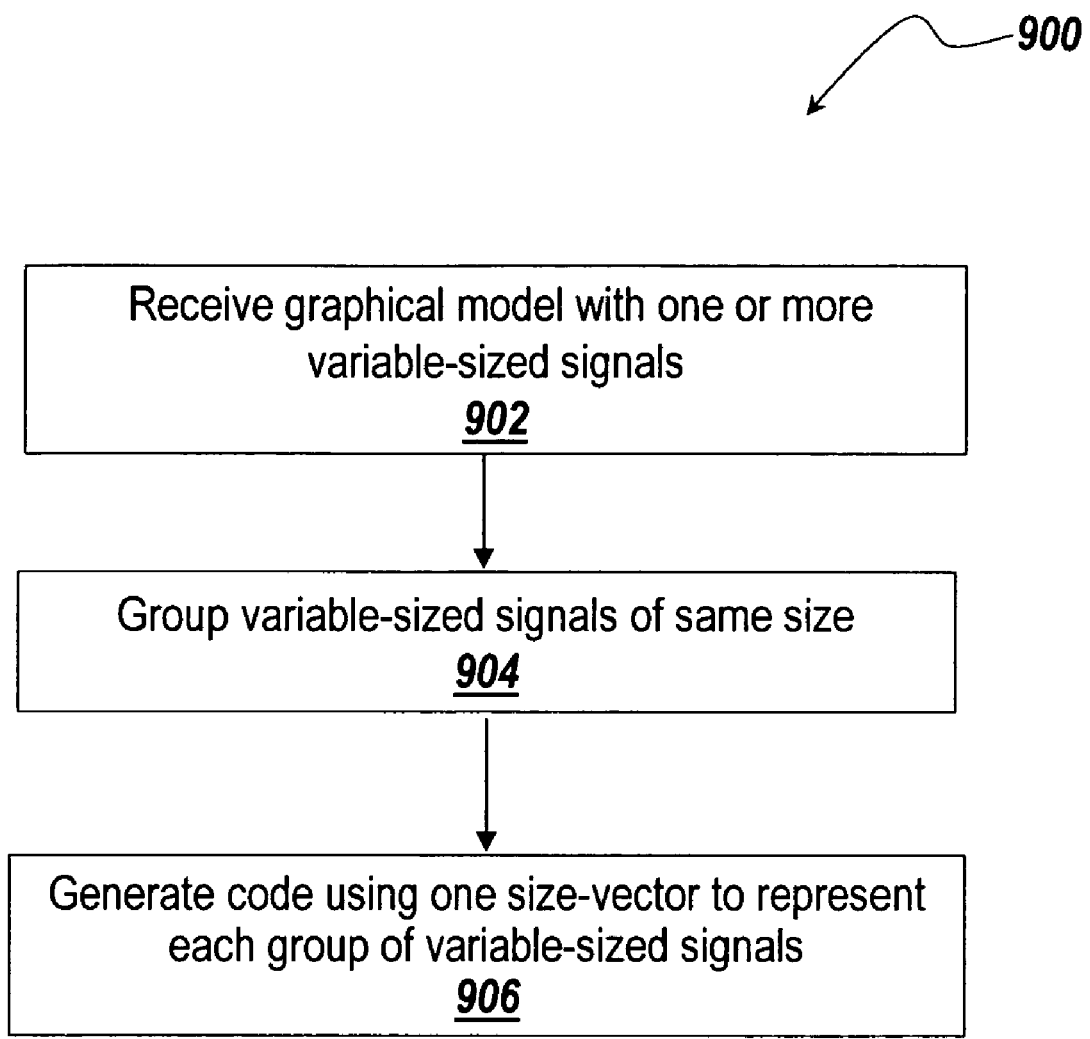
FIG. 9 is a flow diagram illustrating exemplary processing that can be used to implement exemplary embodiments.

The flow diagram 900 of FIG. 9 depicts exemplary processing for automatically generating code for a graphical model that includes at least one variable-sized signal. The processing may begin with obtaining a graphical model with at least one variable-sized signal (step 902). The variable-sized signals having same size may be grouped together (step 904). For example, the user may use a block diagram simulation environment such as the SIMULINK environment to execute the graphical model. In order to execute the model, the corresponding code for the model needs to be generated. The generated code is optimized because one size-vector is used to represent each variable-sized signal group (step 906).

The teachings described herein allow the implementation of signals as objects or structures whose attributes are interpreted differently based on processing requirements of a block in a graphical modeling environment. As such, each block in the environment can propagate a received signal type with its associated data dimensionality unchanged, carry out one or more operations on the data of the received signal type to modify the dimensions of the data to output a signal with the same or different data dimensionalities than the received signal. To accomplish these benefits the modeling interface 102 and textual interface environment 116 operate in conjunction with the graphical model environment 100 to assist in the management, and interpretation of the objects representing signals.

Exemplary implementations may generate code for sharing size-vectors among multiple signals, where some of the signals can be variable-sized signals.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 4 and FIG. 9, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1, 2A and 2B depending on specific deployments and/or applications. Further, disclosed implementations may not be limited to any specific combination of hardware and/or software.

For example, in one alternative implementation, a variable type owner may define the type to be, for example, a struct in C. The struct may have fields that are manipulated based on the types of operations that will be performed and/or types of data to which operations are applied. For example, the struct may have fields that are NULLed out, so they do not consume memory. An owner associated with the variable may dynamically allocate memory when it becomes necessary to do so. Dynamic operations may also be performed with respect to other things, such as objects in general. For example, an owner associated with an object may be able to dynamically configure attributes for the object. Owners associated with variables, objects, etc., may operate in substantially any type of computing environment, such as technical computing environments, non-technical computing environments, etc.

Further, certain portions of the invention may be implemented as "logic" that performs one or more functions. This logic may include hardware, such as hardwired logic, an application-specific integrated circuit, a field programmable gate array, a microprocessor, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A computer-implemented method performed by a processor comprising:
   identifying a plurality of variable-sized signals in a first graphical model, the plurality of variable-sized signals changing size during execution of the first graphical model;
   processing the first graphical model to identify at least two variable-sized signals from the plurality of variable-sized signals, where the identified signals are of a same size during model execution, wherein the processing comprises:
      identifying that a dimension of an output signal is changed by an owner entity of the output signal,
      performing size-propagation, the size-propagation comprising:
         traversing at least a portion of the model in the forward direction to identify the owner entity of the output signal, and
         if dimension information of the output signal is not determined by traversing the portion of the model in the forward direction, traversing at least a portion of the model in the backward direction; and
      grouping the identified signals, where:
         the grouping is based at least in part on the processing and an ownership of the identified signals, and
         the grouping allows the identified signals to share a size-vector;
   automatically generating code from the first graphical model, the generated code comprising:
      code representing at least part of the first graphical model such that one size-vector in the generated code represents the at least two grouped variable-sized signals having the same size during the model execution, where the size-vector in the generated code stores values representing a size of the at least two grouped variable-sized signals of the first graphical model; and
      code for updating one or more values stored in the size-vector during the model execution such that the one or more values stored in the size-vector represent a size of the at least two grouped variable-sized signals during the model execution.

2. The method of claim 1, wherein the first graphical model contains at least one graphical modeling component representing a subsystem.

3. The method of claim 2, wherein the subsystem is a library subsystem.

4. The method of claim 1, further comprising:
   generating code for a subsystem in the first graphical model as a function.

5. The method of claim 4, wherein one or more variable-sized signals of the plurality of variable-sized signals are represented using a same size-vector within the function or within another function in the generated code.

6. The method of claim 4, wherein one or more variable-sized signals of the plurality of variable-sized signals are represented using a same size-vector among two or more functions in the generated code.

7. The method of claim 1, further comprising:
   generating code from a second graphical model referenced within the first graphical model.

8. The method of claim 7, wherein at least one of the plurality of variable-sized signals in the first graphical model and at least one variable-sized signal in the second graphical model are represented using a same size-vector.

9. The method of claim 1, wherein each variable-sized signal is assigned to one graphical modeling component of the first graphical model, said graphical modeling component becoming an owner of the assigned variable-sized signal.

10. The method of claim 9, wherein the owner of the assigned variable-sized signal changes the size of the assigned variable-sized signal, and wherein other components of the graphical model are exempt from changing the size of the assigned variable-sized signal.

11. The method of claim 10, wherein the owner of the assigned variable-sized signal changes the size of the assigned variable-sized signal, the size of all other variable-sized signals of the same owner changes.

12. A non-transitory computing device readable medium holding device readable instructions for automatic code generation from a graphical model wherein the medium comprises:
   instructions for identifying a plurality of variable-sized signals in a first graphical model, the plurality of variable-sized signals changing size during execution of the first graphical model;
   instructions for processing the first graphical model to identify at least two variable-sized signals from the a plurality of variable-sized signals, where the identified signals are of a same size during model execution, wherein the processing comprises:
      identifying that a dimension of an output signal is changed by an owner entity of the output signal,
      performing size-propagation, the size-propagation comprising:
         traversing at least a portion of the model in the forward direction to identify the owner entity of the output signal, and
      if dimension information of the output signal is not determined by traversing the portion of the model in the forward direction, traversing at least a portion of the model in the backward direction;
   instructions for, based at least in part on the processing and an ownership of the identified signals, grouping the identified signals to share a size-vector; and
   instructions for automatically generating code from the first graphical model, the generated code comprising:
      code representing at least part of the first graphical model such that one size-vector in the generated code represents the at least two grouped variable-sized signals having the same size during the model execution, where the size-vector in the generated code stores values representing a size of the at least two grouped variable-sized signals of the first graphical model; and
      code for updating one or more values stored in the size-vector during the model execution such that the one or more values stored in the size-vector represent a size of the at least two grouped variable-sized signals during the model execution.

13. The medium of claim 12, wherein the first graphical model contains at least one graphical modeling component representing a subsystem.

14. The medium of claim 12, also holding instructions for generating code for a subsystem in the first graphical model as a function.

15. The medium of claim 12, wherein one or more variable-sized signals of the plurality of variable-sized signals are represented using a same size-vector within the function or within another function in the generated code.

16. The medium of claim 12, wherein one or more variable-sized signals of the plurality of variable-sized signals are represented using a same size-vector among two or more functions in the generated code.

17. The medium of claim 12, also holding instructions for generating code from a second graphical model referenced within the first graphical model.

18. The medium of claim 17, wherein at least some of the plurality of variable-sized signals in the first graphical model and at least one variable-sized signal in the second graphical model are represented using a same size-vector.

19. The medium of claim 12, wherein each variable-sized signal is assigned to one graphical modeling component of the graphical model, said graphical modeling component becoming an owner of the assigned variable-sized signal.

20. The medium of claim 19, wherein the owner of the assigned variable-sized signal changes the size of the assigned variable-sized signal, and wherein other components of the graphical model are exempt from changing the size of the assigned variable-sized signal.

21. The medium of claim 20, wherein the owner of the assigned variable-sized signal changes the size of the assigned variable-sized signal, the size of all other variable-sized signals of the owner changes.

22. A computing device for automatic code generation from a graphical model, the system comprising:
   a processor for executing:
      a graphical modeling environment to provide a graphical model with a plurality of variable-sized signals having a size that can change during the execution of the graphical model;
      a processing engine:
         for processing the graphical model to identify at least two variable-sized signals from the plurality of variable-sized signals, where the identified signals are of a same size during model execution,
         wherein the processing comprises:
            identifying that a dimension of an output signal is changed by an owner entity of the output signal,
            performing size-propagation, the size-propagation comprising:
               traversing at least a portion of the model in the forward direction to identify the owner entity of the output signal, and
            if dimension information of the output signal is not determined by traversing the portion of the model in the forward direction, traversing at least a portion of the model in the backward direction, and
         for grouping the identified signals to share a size-vector based at least in part on an ownership of the identified signal; and
      a code generator for automatically generating code from the graphical model, the generated code comprising:
         code in which one size-vector represents of the at least two grouped variable-sized signals having the same size in time during the model execution, where the size-vector in the generated code stores values representing a size of the at least two grouped variable-sized signals of the graphical model;
         code for updating one or more values stored in the size-vector during the model execution such that the one or more values stored in the size-vector represent a size of the at least two grouped variable-sized signals during the model execution; and
   a storage device.

23. The system of claim 22, wherein the code generator generates a minimum number of size-vectors to represent all the plurality of variable-size signals of the graphical model.

24. The system of claim 22, further comprising:
   generating code for a subsystem as a function.

25. The system of claim 22, further comprising:
   generating code for a subsystem as a standalone model and referencing the standalone model in the graphical model.

26. A computing device for automatic code generation from a graphical model from a graphical modeling environment, the computing device comprising:

means for processing the first graphical model to identify a plurality of variable-sized signals that can change size during execution of a first graphical model, wherein the processing comprises:
  identifying that a dimension of an output signal is changed by an owner entity of the output signal,
  performing size-propagation, the size-propagation comprising:
    traversing at least a portion of the model in the forward direction to identify the owner entity of the output signal, and
  if dimension information of the output signal is not determined by traversing the portion of the model in the forward direction, traversing at least a portion of the model in the backward direction;
means for identifying at least two variable-sized signals from the plurality of variable-sized signals, where the identified signals are of a same size during model execution; and
means for, based at least on the processing and an ownership of the identified signals, grouping the identified signals to share a size-vector;
means for generating code from the first graphical model, the generated code comprising:
  code representing the first graphical model such that one size-vector in the generated code represents the at least two grouped variable-sized signals having the same size in time during the model execution, where the size-vector in the generated code stores values representing a size of the at least two grouped variable-sized signals of the first graphical model; and
  code for updating one or more values stored in the size-vector during the model execution such that the one or more values stored in the size-vector represent a size of the at least two grouped variable-sized signals during the model execution.

27. The computing device of claim 26, wherein one or more of the plurality of the variable-sized signals are represented using a same size-vector within a function in the generated code.

28. The computing device of claim 26, wherein one or more of the plurality of variable-sized signals are represented using a same size-vector among two or more functions in the generated code.

29. The computing device of claim 26, wherein each variable-sized signal is assigned to one graphical modeling component of the graphical model, said graphical modeling component becoming an owner of the assigned variable-sized signal.

30. The computing device of claim 29, wherein the owner of the assigned variable-sized signal changes the size of the assigned variable-sized signal, and wherein other components of the graphical model are exempt from changing the size of the assigned variable-sized signal.

31. The computing device of claim 30, wherein the owner of the assigned variable-sized signal changes the size of the assigned variable-sized signal, the size of all other variable-sized signals of the same owner changes.

* * * * *